(12) United States Patent
Nurmi et al.

(10) Patent No.: US 11,372,971 B2
(45) Date of Patent: Jun. 28, 2022

(54) THREAT CONTROL

(71) Applicant: F-Secure Corporation, Helsinki (FI)

(72) Inventors: Henri Nurmi, Espoo (FI); Artturi Lehtio, Espoo (FI); Paolo Palumbo, Espoo (FI)

(73) Assignee: F-Secure Corporation, Helsinki (FI)

( * ) Notice: Subject to any disclaimer, the term of this patent is extended or adjusted under 35 U.S.C. 154(b) by 51 days.

(21) Appl. No.: 16/423,738

(22) Filed: May 28, 2019

(65) Prior Publication Data

US 2019/0370462 A1  Dec. 5, 2019

(30) Foreign Application Priority Data

May 30, 2018  (GB) .................................... 1808757

(51) Int. Cl.
| | |
|---|---|
| *G06F 21/00* | (2013.01) |
| *G06F 21/55* | (2013.01) |
| *G06F 21/56* | (2013.01) |
| *H04L 9/40* | (2022.01) |
| *G06F 8/65* | (2018.01) |

(52) U.S. Cl.
CPC ............ *G06F 21/554* (2013.01); *G06F 21/56* (2013.01); *G06F 8/65* (2013.01); *G06F 2221/033* (2013.01); *H04L 63/145* (2013.01)

(58) Field of Classification Search
None
See application file for complete search history.

(56) References Cited

U.S. PATENT DOCUMENTS

| | | | | |
|---|---|---|---|---|
| 7,685,627 | B2 * | 3/2010 | Joubert | H04L 63/0263 |
| | | | | 726/1 |
| 8,191,167 | B2 * | 5/2012 | Frerebeau | G06F 21/51 |
| | | | | 726/34 |
| 8,516,582 | B2 * | 8/2013 | Thorley | H04L 63/20 |
| | | | | 726/22 |
| 8,719,568 | B1 * | 5/2014 | Antypas, III | H04L 63/0884 |
| | | | | 713/168 |
| 8,996,659 | B2 * | 3/2015 | Werth | H04L 67/34 |
| | | | | 709/219 |
| 9,407,652 | B1 * | 8/2016 | Kesin | G06N 7/005 |
| 10,165,005 | B2 * | 12/2018 | Urmanov | H04L 63/1483 |
| 2002/0046244 | A1 * | 4/2002 | Bimson | G06F 40/166 |
| | | | | 709/205 |
| 2004/0230834 | A1 * | 11/2004 | McCallam | H04L 67/306 |
| | | | | 726/23 |
| 2007/0157312 | A1 * | 7/2007 | Joubert | H04L 63/0263 |
| | | | | 726/13 |
| 2010/0257609 | A1 * | 10/2010 | Niemela | G06F 21/56 |
| | | | | 726/24 |

(Continued)

*Primary Examiner* — Maung T Lwin
(74) *Attorney, Agent, or Firm* — Harrington & Smith

(57) ABSTRACT

There is provided a threat control method on a computer system including: collecting one or more events from a first endpoint, each event identifying one or more attributes associated to the event; detecting a security threat related to one or more of the collected events; searching matching events from one or more further endpoints, wherein the matching event includes at least part of the same attributes than the one or more events related to the detected security threat; and in case a matching event with at least part of the same attributes is found, identifying the associated endpoint as being related to a security threat similar to what was earlier detected.

16 Claims, 3 Drawing Sheets

(56) References Cited

U.S. PATENT DOCUMENTS

| | | | |
|---|---|---|---|
| 2012/0054057 A1* | 3/2012 | O'Connell | G06Q 30/0601 705/26.1 |
| 2012/0216278 A1* | 8/2012 | Thorley | H04L 63/20 726/22 |
| 2013/0042298 A1* | 2/2013 | Plaza Fonseca | H04L 63/102 726/1 |
| 2013/0185797 A1* | 7/2013 | Zhou | G06F 21/566 726/23 |
| 2013/0191901 A1* | 7/2013 | Black | H04L 63/0876 726/7 |
| 2013/0305378 A1* | 11/2013 | Johnson | G06Q 20/4014 726/26 |
| 2015/0205960 A1* | 7/2015 | Zhou | G06F 16/955 726/23 |
| 2015/0213246 A1 | 7/2015 | Turgeman et al. | |
| 2015/0222656 A1* | 8/2015 | Haugsnes | H04L 63/1441 726/23 |
| 2016/0156648 A1* | 6/2016 | Zisapel | H04L 63/1441 726/23 |
| 2016/0164890 A1* | 6/2016 | Haugsnes | G06F 16/24575 726/23 |
| 2017/0070524 A1* | 3/2017 | Bailey | H04L 67/02 |
| 2017/0070527 A1* | 3/2017 | Bailey | H04L 67/30 |
| 2017/0093897 A1* | 3/2017 | Cochin | G06F 21/566 |
| 2017/0149802 A1* | 5/2017 | Huang | G06F 21/577 |
| 2018/0013774 A1* | 1/2018 | Sander | H04L 63/1416 |
| 2018/0069896 A1* | 3/2018 | Urmanov | H04L 63/1425 |
| 2018/0167402 A1* | 6/2018 | Scheidler | G06F 21/554 |
| 2018/0288085 A1* | 10/2018 | Hailpern | H04L 63/1425 |
| 2018/0365419 A1* | 12/2018 | Monastyrsky | G06F 21/54 |
| 2019/0020676 A1* | 1/2019 | Laughlin | H04L 63/1416 |

\* cited by examiner

THREAT CONTROL

FIELD OF THE INVENTION

The present invention relates to improving the security of a computer system that employs event profiling to detect threats against the computer system.

BACKGROUND

The term "malware" is short for malicious software and is used to refer to any software designed to infiltrate or damage a computer system without the owner's informed consent. Malware can include viruses, worms, Trojan horses, rootkits, adware, spyware and any other malicious and unwanted software. Many computer devices, such as desktop personal computers (PCs), laptops, personal data assistants (PDAs) and mobile phones can be at risk from malware.

A computer system will generally run a number of applications. Security applications are often configured to identify malicious applications, for example by comparison of an application installed on the computer system with a database of known applications. However, as malware becomes more sophisticated, it has become increasingly difficult to identify security threats and distinguish malicious events from benign computer processes and user activities.

In the field of computer security and event management, it is also typical that various event data is collected from endpoint client computers and the data is then analysed to enhance security. The analysis of data may be used to identify various security threats/attacks on the computer network or an endpoint device. However, analysing data of large networks is difficult and consumes resources of the computer system.

Thus, there is a need for enhanced processes for detecting and preventing computer systems from security threats, such as malware.

SUMMARY

Various aspects of examples of the invention are set out in the claims.

According to an aspect of the invention, there is provided a method of threat control as specified in the claim.

According to an aspect of the invention, there is provided a server as specified in the claims.

According to an aspect of the invention, there is provided a computer program as specified in the claims.

According to an aspect of the invention, there is provided a computer program product as specified in the claims.

Further embodiments of the invention are defined in the dependent claims.

DETAILED DESCRIPTION

The embodiments of the invention aim to solve the issues discussed earlier by providing a threat control solution where first one or more events are collected from a first endpoint, and next a sequence of events or a subset of the events or one of the events is detected to cause an alert related to a security threat. Each of the events is described as a collection of various attributes where one or more of these attributes of the event related to the security threat are selected for searching other events that are similar to the original event according to a relevant similarity criteria. Whenever a matching event is found, the associated endpoint is identified as being related to a security threat similar to what was earlier detected.

Relevant detection sensors may be used to collect the events used in the analysis; this includes, but is not limited to, sensors installed directly on the endpoints in question, or sensors monitoring the overall activity of the network or network segment. Once a security threat related to one or more of the collected events is detected, a subset of the attributes of the events related to the detected security threat may be generated. The subset of the attributes selected to describe the event that triggered the security alert can then be used to search for similar activity on the same or other endpoints. In an embodiment, endpoint application control may also provide reporting service to administrator. The reporting service may describe the security threat identified and thus help administrator in understanding the risks of running specific applications/processes related to the security threat.

The proposed method is extremely effective in situations where a security threat (e.g. maliciousness of a file) is identified on a first endpoint; through this detection other endpoints can be effectively searched to verify whether they have also suffered from a similar threat.

Figure 1:
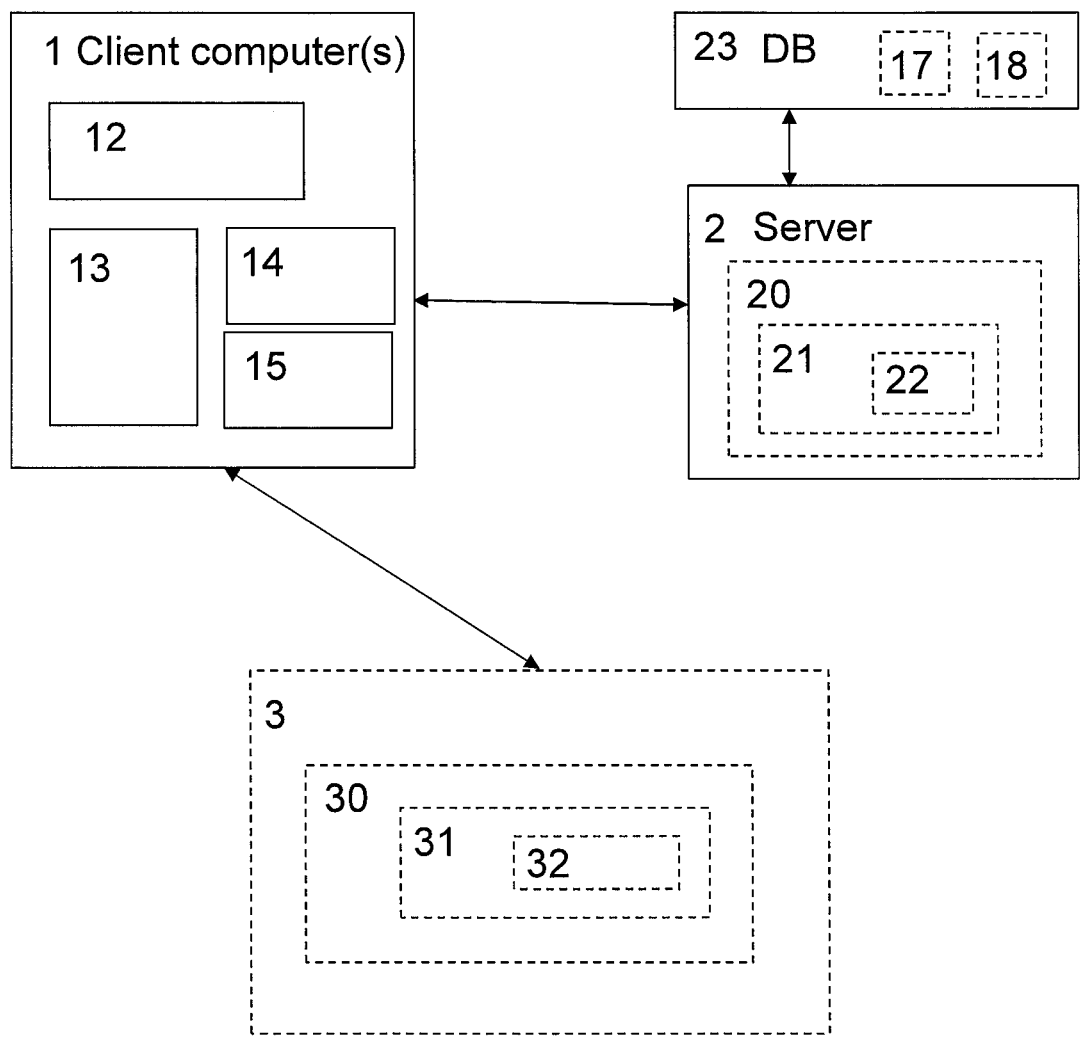
FIG. 1 is a schematic diagram of a system.

An example schematic diagram of a system according to the invention will be described with reference to FIG. 1. A client computer(s) 1 have installed thereon a security module 14 that may comprise a security application provided by a security service provider and any number of detection sensors used to monitor the client computer 1. The computer runs a number of further applications, and the security module 14 may monitor actions taken by those further applications. The client computer 1 may connect to a server 2, and the security module 14 sends results of the monitoring to the server 2 for analysis, or the analysis may be performed at the client computer 1 by the security application. Data 17 relating to applications or services may be stored in a database 23. For example, event profiles, related attributes associated to the events and the lists of the attributes of the events related to the detected security threat may be constructed at the client 1 by the security application, at the server 2, and/or at a second server 3 and be stored in a database 23. The client computer 1 and the servers 2 and 3 each typically comprise a hard drive 12, 20, 30, a processor 13, 21, 31, and RAM 15, 22, 32. The client computer 1 may connect to the servers 2 and 3 over the Internet, or any suitable network. The servers 2 and 3 (if used) may be operated by the security service provider or by the client computer 1; e.g. "on-premises" security solutions may be used.

Figure 2:
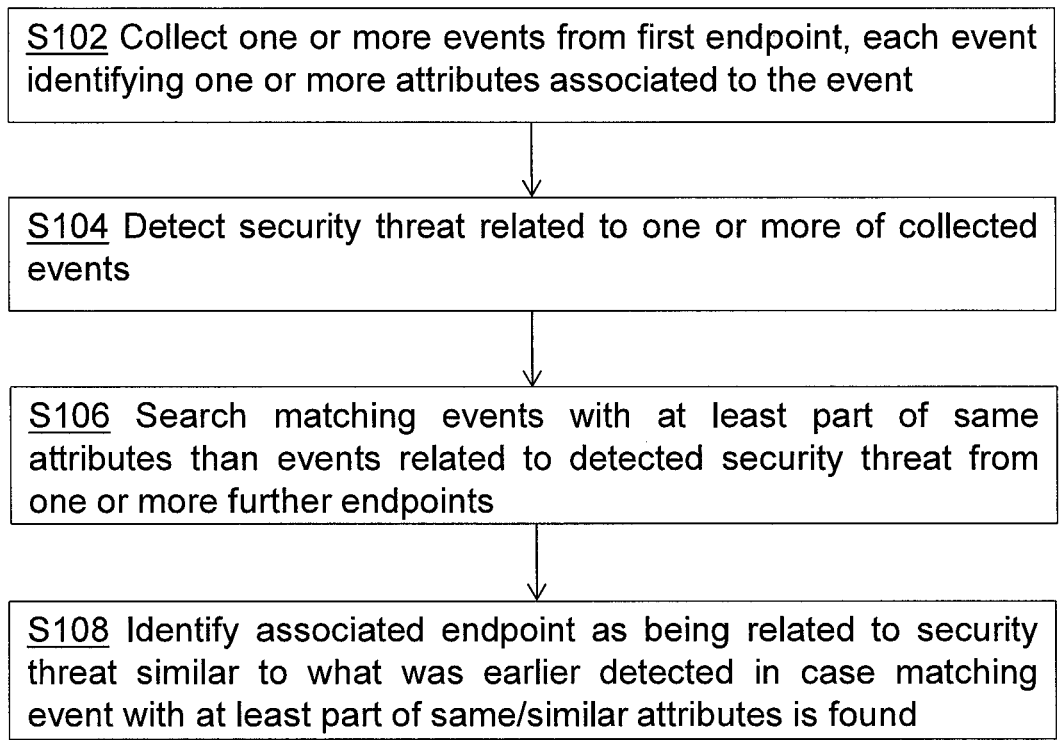
FIG. 2 is a flowchart of threat control method according to an embodiment.

FIG. 2 is a flowchart of a method. The method described herein may take place in a computer device, such as a server backend computer communicating with an endpoint/client device, for example. It is also possible that at least some of the method steps take place in the endpoint/client device.

In S102, a server backend collects one or more events from a first endpoint, wherein each event identifies one or more attributes associated to the event.

In S104, the server backend detects a security threat related to one or more of the collected events. The detection can be based on data received from an end point or based on results from a security analysis conducted at the backend server or any other security server, for example.

In S106, the server backend searches matching events collected from one or more further endpoints, wherein the matching event comprises a subset or at least part of the same attributes than the one or more events related to the detected security threat. In an embodiment, the one or more further endpoints may also refer to the first endpoint in which case another event or events than what was detected in S104 may be determined to be the matching event(s).

In S108, the server backend identifies the associated endpoint as being related to a security threat similar to what was detected in S104 if a matching event with at least part of the same attributes is found.

In an embodiment, the server backend may generate subset of any events or a list of at least part of the attributes of the one or more events related to the detected security threat and search the matching events comprising at least part of the same attributes than in the generated list from the one or more further endpoints.

In an embodiment, the server backend may collect one or more sequences of events from the first endpoint, detect the security threat related to a specific sequence of events collected or a subset of the sequence of events, and generate the list on the basis of at least part of the attributes of the specific sequence of events or the subset of the sequence of events. In an embodiment, in case a specific sequence of events is collected, the events in the sequence are not required to have any causal relationship, but it is enough for them to be a temporal sequence or even to use any other heuristic to select events from a temporal stream of device-specific events. Thus, the proposed method is implementable also when a causal relationship cannot be identified and building an event graph is not possible. Thus, utilizing attributes derived from the sequence of events of a first end point to evaluate the state of a second endpoint is enabled.

In an embodiment, the server backend may generate a security alert similar to a security alert associated to the security threat detected in S104.

In an embodiment, the attributes known to be associated to an event may relate to one or more procedures of: establishment of a secure session, communication over a secure session, file operations, registry operations, memory operations, network operations, process/threat creation, application start, application exit.

In an embodiment, the server backend may provide the generated list of at least part of the attributes of the one or more events related to the detected security threat to one or more endpoints/client computer devices for enabling the one or more endpoints/client computer devices to identify the security threat and to take further action on the basis of the identified security threat.

In an embodiment, the server backend may take further action on the basis of the identified security threat by one or more of: blocking, terminating or preventing one or more events or applications related to the identified security threat installed on one or more end points/client computer devices; warning a user of an end point/computer device related to the identified security threat; providing a software update to one or more of the end points/computer devices.

In an embodiment, matching events are determined according to relevant distance criteria, which takes into account the different domains of the attributes that describe the events. This may include, but is not limited to, for example, exact match of attributes, partial matching of attributes, heuristic or probabilistic matching and domain specific matching techniques. Other suitable matching techniques can also be used.

Monitoring is used to collect the events and event attributes related to detected security threats. A log of results of the monitoring taken from the end points/client computer devices may be stored. The server may maintain collected events, related attributes and detected security threats in a database. The event attributes may be used to identify how the application in an end point implements one or more procedures, for example how an SSL or other secure connection is established, how the application edits registry entries, or any other operation such as file access, network access or memory related operations.

The event attributes may identify, for each procedure, a characteristic action (which will typically be the action which is the result of the procedure) and one or more expected actions. For example, in the case of an SSL connection, the characteristic action may be the sending of an SSL encrypted message, and the expected actions may include a call to a library which provides an SSL implementation.

In an embodiment, selecting the attributes from the collected events that are further used to retroactively scan for the related malicious activity/security threat may be done in a number of ways.

In an example embodiment, advantage of existing systems and technologies may be taken as follows: when the monitoring system produces a detection of a security threat, this is in turn associated to one or more events, each of which is further comprised of multiple attributes. As an example, let's consider a situation in which a detection is produced, and such detection is associated with a single event. The attributes contained in the event associated to the detection can be used to retroactively scan the totality of collected events for similar incidents. All the attributes associated with the event may not be suitable, hence there is a need to carefully select meaningful attributes. One simple metric that can be used to assess the suitability of an attribute comprises the following steps:

1. Ensuring that the intersection between the set of all the events that match the considered attributes' value ($E_a$) and the set of all events that have a baseliner score of 0 ($E_b$) is empty (∅), the baseliner score in this example referring to a similarity score for normalized events calculated against a set of common, well-known events originating from trusted activity;
2. At the same time, ensuring that the cardinality of the set resulting from the intersection between $E_a$ and the set of all events (E) is not exceedingly large; in other words: $\|E_a \cap E\| \leq n$ where n is an upper bound that can be defined as needed.

Essentially, points 1 and 2 can be effectively summarized as:

$$\begin{cases} E_a \cap E_b = \emptyset \\ \|E_a \cap E\| \leq n \end{cases}$$

The above set of constraints are a practical example of a method for selecting attributes that may be implemented without generating false positives. However, any other suitable approaches are also possible.

Further, when calculating $E_a$, the concept of "matching the considered attributes' value" is to be understood broadly; for example, if the attribute value belongs to the realm of strings then a "match" could be defined as full match, case insensitive full match, partial match, string edit distance below a certain threshold or any other relevant distance metrics associated with the domain in question.

Additionally, while the example above shows the use of a single attribute, the embodiments of the invention do not preclude using multiple attributes instead.

In an example embodiment, attributes from a sequence of events rather than attributes from only a single event may be used. For example, DNA sequence search algorithms may be leveraged to efficiently match attributes from sequences of events.

The following list describes examples of possible events that may be collected:
creating and modifying system files and settings,
installing, updating and removing system components,
modifying other applications,
registering application automatic start launch points,
requesting user elevation (UAC),
creating system files,
creating and modifying user files,
running other processes,
loading of specific modules by application,
receiving data from specific remote host computers,
downloading files,
opening a local server.

It is possible to discover events from multiple sources, such as executing application in a controlled sandbox, receiving events from crowdsourcing (client upstream) and using static analysis for the application components.

The attribute of the event may refer to specific values or metadata that define a property of an event. An attribute may comprise at least one of: a name, a value, a type, a class. An attribute may be metadata attached to a field or a block of code like assemblies, members and types.

Figure 3:
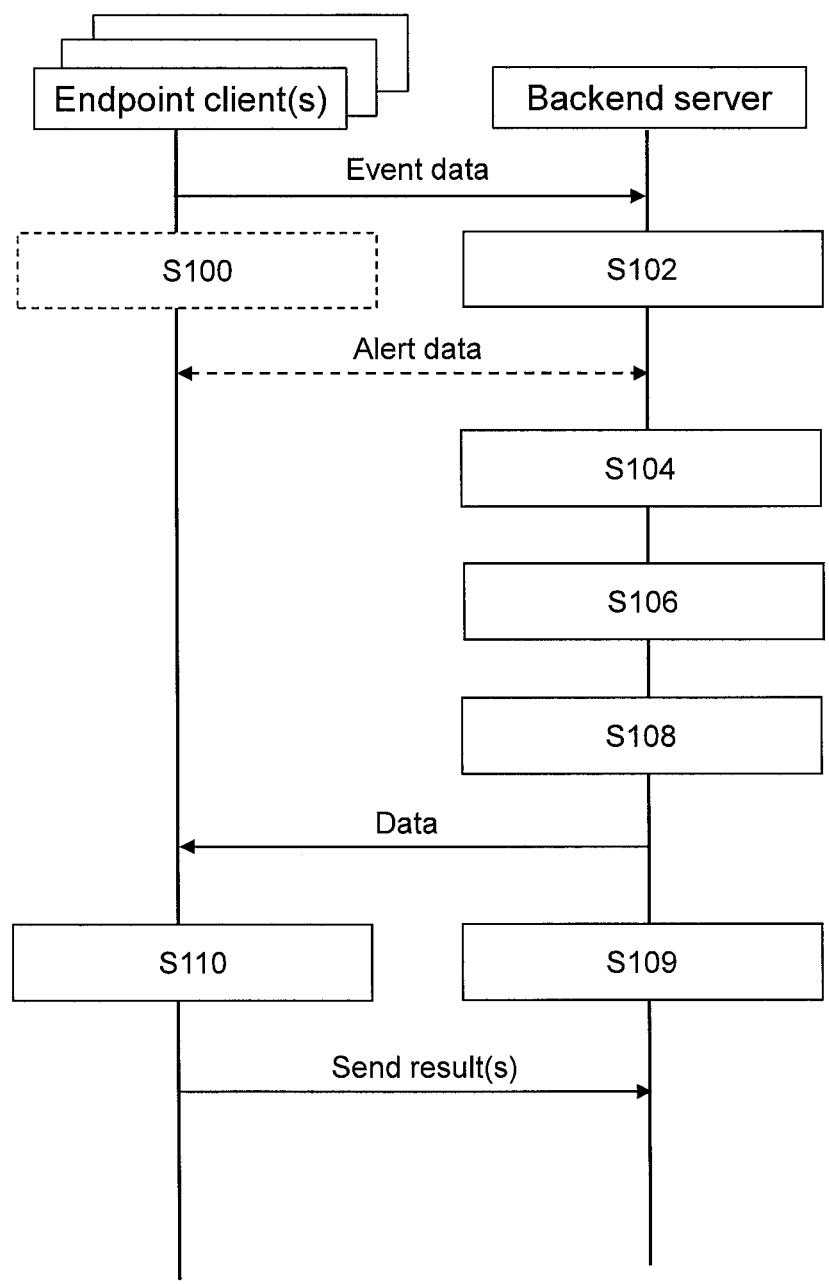
FIG. 3 is a signal sequence diagram that shows another example of the process.

FIG. 3 is a signal sequence diagram that shows one example of the process. The steps S102, S104, S106 and S108 described in relation to FIG. 2 are illustrated in the diagram. Backend server and the endpoint clients may continue data exchange continuously or periodically to update maintained database of attributes of the one or more events related to the detected security threat S109 and/or to exchange any related data, e.g. from the further actions taken related to detected security threats S110. The end point clients and the backend server may also exchange data related to security threats that are detected in S100 and/or S104.

Results from the monitoring are compared against the attributes related to a security threat in the maintained database and determination is made on whether a security threat similar to what was seen before can be identified based on the comparison. Further actions that can be taken comprise for example allowing normal/expected events of the applications while blocking the prohibited events (e.g. events related to a security threat). Further, any deviation from the normal events may be used to flag the associated application as malicious or suspicious, i.e. the application may be compromised (e.g. by injection of malicious code), or the application may be a malicious application pretending to be a legitimate application.

In case a security threat is identified, the related end point and/or end point application may be flagged as malicious or suspicious and further malware scans may be performed. If an application has been identified as malicious or suspicious, further action may be taken to remove or reduce the threat. The type of response will depend on the type of threat. It may be sufficient to terminate the process, or just the procedure, as there may not be any permanent alteration to the application. The application may also be quarantined, deleted or otherwise made safe. It is also possible to quarantine the related end point by a network administration system until the threat has been removed or otherwise made safe.

Event attribute profiles may be created on the backend, i.e. by a security service provider and provided to the security application at the client computer. This profiling may be performed by an automated and/or manual analysis of events. The event attribute profile may be created either at the client computer or the server for example by examining the binary code of the applications.

The monitoring of the events may be performed by detection sensors installed on end points and/or a standalone software module of the security application, or by a plugin: a combination of different approaches may also be used.

The monitoring of events that a specific end point performs and selecting the related attributes may be performed at the client computer. Alternatively, the client computer may monitor/analyse the events, and send details of attributes to a server, along with identification information for the monitored event. The information may be sent periodically, or only when specific events are detected. The server maintains a database of event attributes related to security threats detected in one or more specific end points and the related data thereof that is required.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of threat control on a computer system, the method comprising:
a) collecting a plurality of events from applications or processes executed by a first endpoint, wherein the collected plurality of events identify attributes of procedures comprising:
establishment of a secure session;
communication over a secure session;
file operations;
registry operations;
memory operations; and
process/threat creation;
and
the collected plurality of events comprise:
creating and modifying system files and settings,
installing, updating and removing system components,
modifying other applications,
registering application automatic start launch points,
requesting user elevation (UAC),
creating system files,
creating and modifying user files,
running other processes,
loading of specific modules by application,
receiving data from specific remote host computers,
downloading files, and
opening a local server, wherein the attributes identify characteristic actions and expected actions of the procedures;

b) detecting a security threat of the collected plurality of events;

c) searching matching events of the collected plurality of events from one or more further endpoints, wherein a matching event comprises at least one attribute of the attributes; and d) based on finding at an associated endpoint the matching event with at least the one attribute of the attributes, identifying the associated endpoint as being related to a security threat similar to what was detected in step b).

2. The method according to claim 1, the method further comprising generating a list of at least part of the attributes of the collected plurality of events related to the detected security threat and searching matching events from the one or more further endpoints.

3. The method according to claim 2, the method further comprising collecting one or more sequences of the collected plurality of events from the first endpoint; detecting that the detected security threat is related to a specific sequence of events of the collected plurality of events or a subset of the specific sequence of events; and generating the list based on at least part of the attributes of the specific sequence of events or the subset of the specific sequence of events.

4. The method according to claim 2, the method further comprising providing the generated list of at least one of the attributes of the collected plurality of events related to the detected security threat to one or more client computer devices for enabling the one or more client computer devices to identify the detected security threat and to take further action based on the identified detected security threat.

5. The method according to claim 4, the method further comprising based on the identified detected security threat by one or more of: blocking, terminating or preventing one or more events of the collected plurality of events or applications related to the identified detected security threat installed on one or more client computer devices; warning a user of an end point related to the identified detected security threat; providing a software update to one or more of the end points.

6. The method according to claim 1, the method further comprising generating a security alert corresponding to the detected security threat detected in step b).

7. The method according to claim 1, wherein a matching event is determined based on a relevant distance criteria associated with different domains of the attributes, wherein the relevant distance criteria includes at least one of: an exact match of attributes, a partial match of attributes, heuristic or probabilistic matching and domain specific matching techniques.

8. The method according to claim 1, wherein the matching event comprises a subset or at least part of the attributes of the collected plurality of events related to the detected security threat.

9. A server comprising:
a memory configured to store one or more lists of attributes of events related to detected security threats in a computer network;
a processor configured to:
a) collect a plurality of events from applications or processes executed by a first endpoint, wherein the collected plurality of events identify attributes that relate to procedures comprising:
establishment of a secure session;
communication over a secure session;
file operations;
registry operations;
memory operations; and
process/threat creation;
and
the collected plurality of events comprise:
creating and modifying system files and settings,
installing, updating and removing system components,
modifying other applications,
registering application automatic start launch points,
requesting user elevation (UAC),
creating system files,
creating and modifying user files,
running other processes,
loading of specific modules by application,
receiving data from specific remote host computers,
downloading files, and
opening a local server,
wherein the attributes identify, characteristic actions and expected actions of procedures;

b) detect a security threat related to one or more of the collected plurality of events;

c) search matching events of the collected plurality of events from one or more further endpoints, wherein a matching event comprises at least one attribute of the attributes; and d) identify an associated endpoint as being related to a security threat similar to what was detected in step b) based on finding the matching event with at least at least the one attribute of the attributes.

10. The server according to claim 9, the processor being further configured to generate a list of at least part of the attributes of the collected plurality of events related to the detected security threat and searching matching events from the one or more further endpoints based on the generated list.

11. The server according to claim 10, the processor being further configured to collect one or more sequences of the collected plurality of events from the first endpoint; detect that the detected security threat is related to a specific sequence of events of the collected plurality of events or a subset of the specific sequence of events; and generate the list based on at least part of the attributes of the specific sequence of events or the subset of the specific sequence of events.

12. The server according to claim 10, the processor being further configured to provide the generated list of at least one of the attributes of the collected plurality of events related to the detected security threat to one or more client computer devices for enabling the one or more client computer devices to identify the detected security threat and to take further action based on the identified detected security threat.

13. The server according to claim 9, the processor being further configured to generate a security alert corresponding to the security threat detected in step b).

14. The server according to claim 9, the processor being further configured to based on the identified detected security threat one or more of: blocking, terminating or preventing one or more events of the collected plurality of events or applications related to the identified detected security threat installed on one or more client computer devices;
warning a user of an end point related to the identified detected security threat; providing a software update to one or more of the end points.

15. The server according to claim 9, wherein a matching event is determined based on a relevant distance criteria associated with different domains of the attributes associated to the event, wherein the distance criteria includes at least one of: an exact match of attributes, a partial match of attributes, heuristic or probabilistic matching and domain specific matching techniques.

16. A non-transitory computer storage medium having stored thereon computer program code for implementing a method of threat control on a computer system, comprising:
 a) collecting a plurality of events from applications or processes executed by a first endpoint, wherein the collected plurality of events identify attributes that relate to procedures of:
  establishment of a secure session;
  communication over a secure session;
  file operations;
  registry operations;
  memory operations;
  network operations;
  process/threat creation; and
  application start/exit; and
 the collected plurality of events comprise:
  creating and modifying system files and settings,
  installing, updating and removing system components,
  modifying other applications,
  registering application automatic start launch points,
  requesting user elevation (UAC),
  creating system files,
  creating and modifying user files,
  running other processes,
  loading of specific modules by application,
  receiving data from specific remote host computers,
  downloading files, and
  opening a local server,
 wherein the attributes identify, for each procedure, characteristic actions and expected actions of the procedures;
 b) detecting a security threat related to one or more of the collected plurality of events;
 c) searching matching events of the collected plurality of events from one or more further endpoints, wherein a matching event comprises at least one attribute of the attributes; and
 d) based on finding at an associated endpoint the matching event with the at least one attribute of the attributes, identifying the associated endpoint as being related to a security threat similar to what was detected in step b).

* * * * *